R. G. AVERILL AND C. H. TOMLINSON.
MULTIPLE ELECTRIC AIR AND CAR COUPLING.
APPLICATION FILED JULY 7, 1917.
1,353,557.
Patented Sept. 21, 1920.
7 SHEETS—SHEET 4.
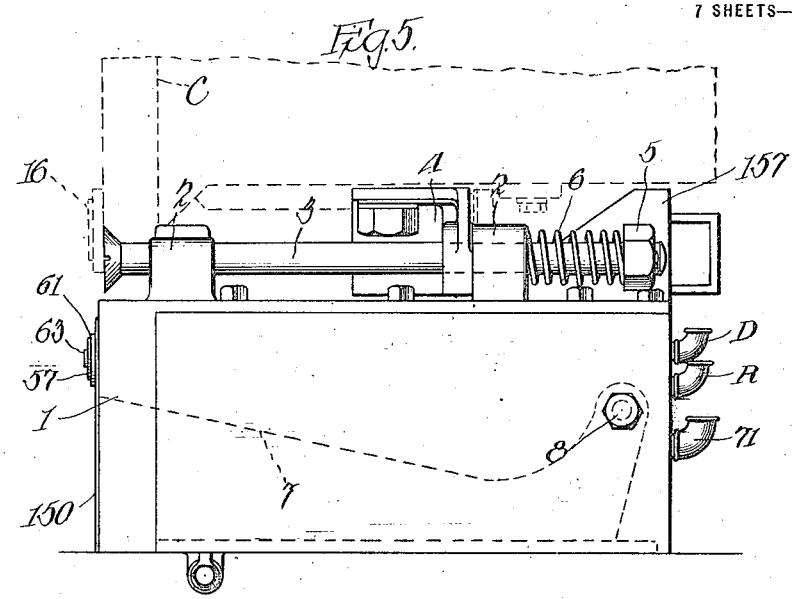
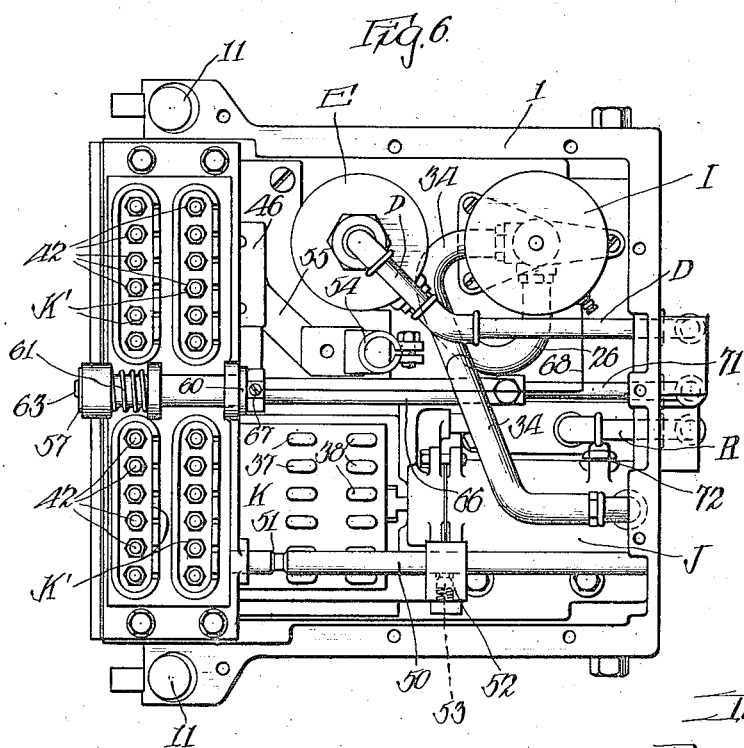

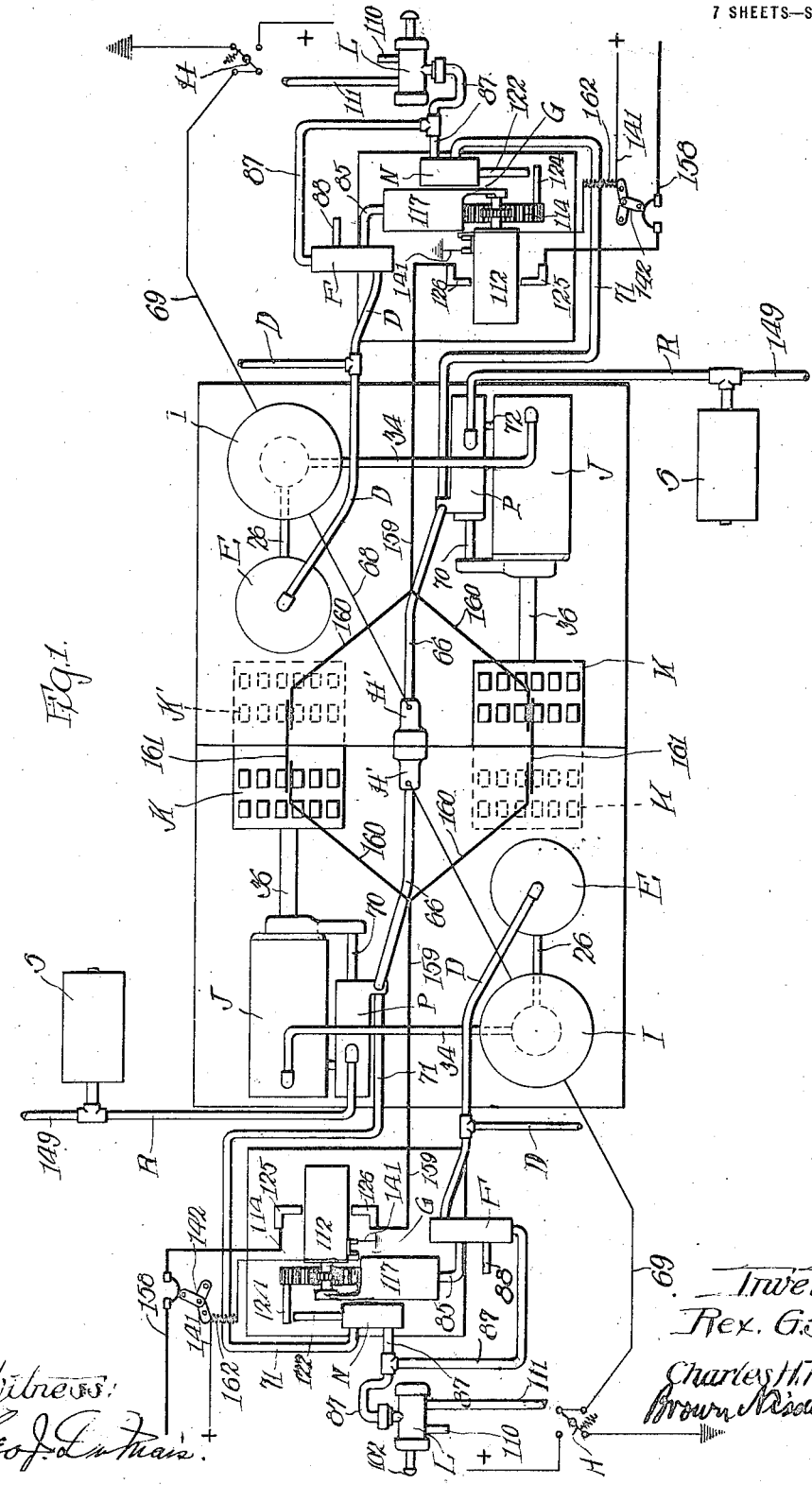

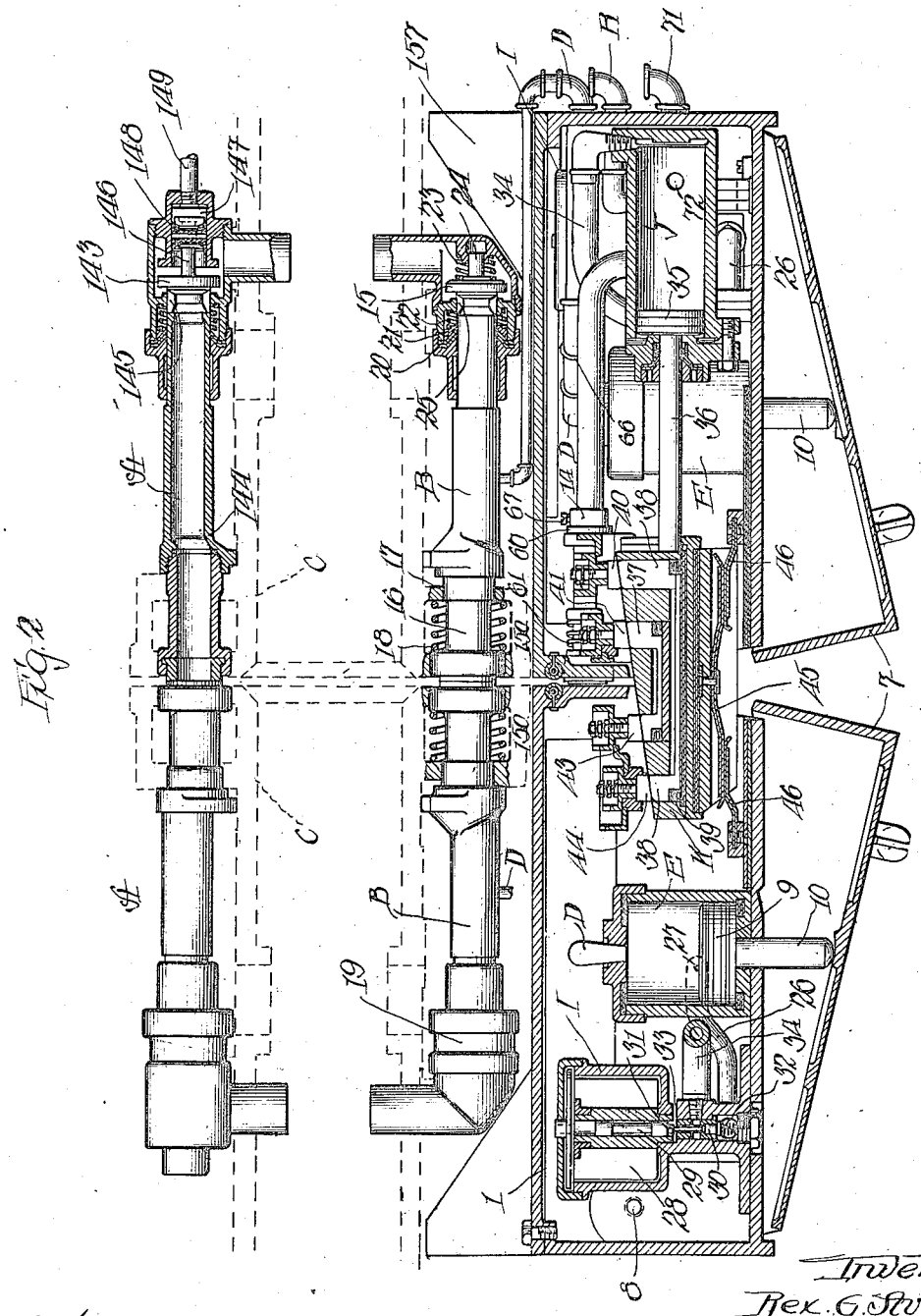

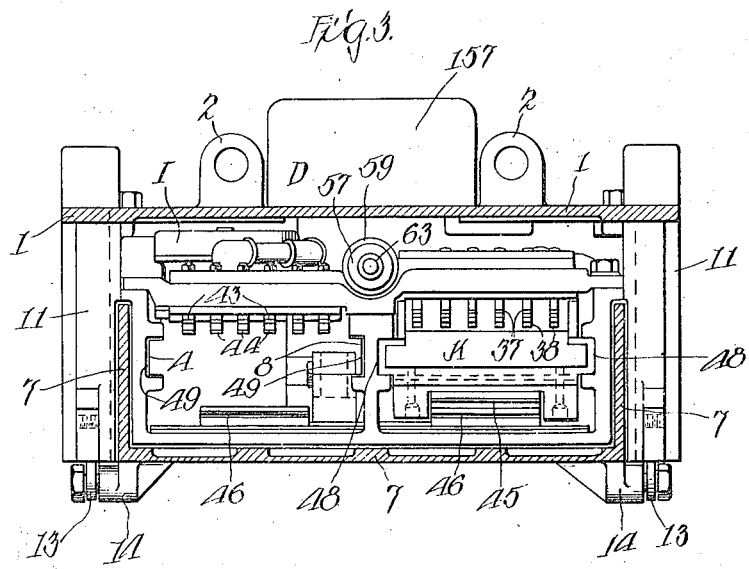
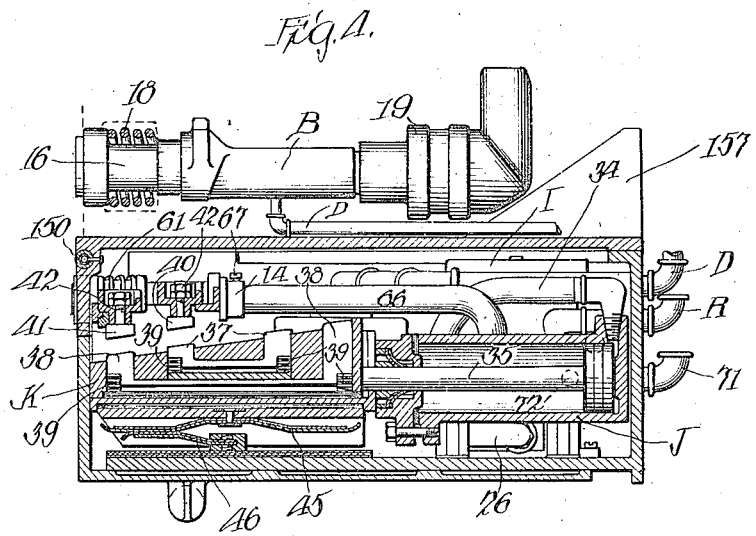

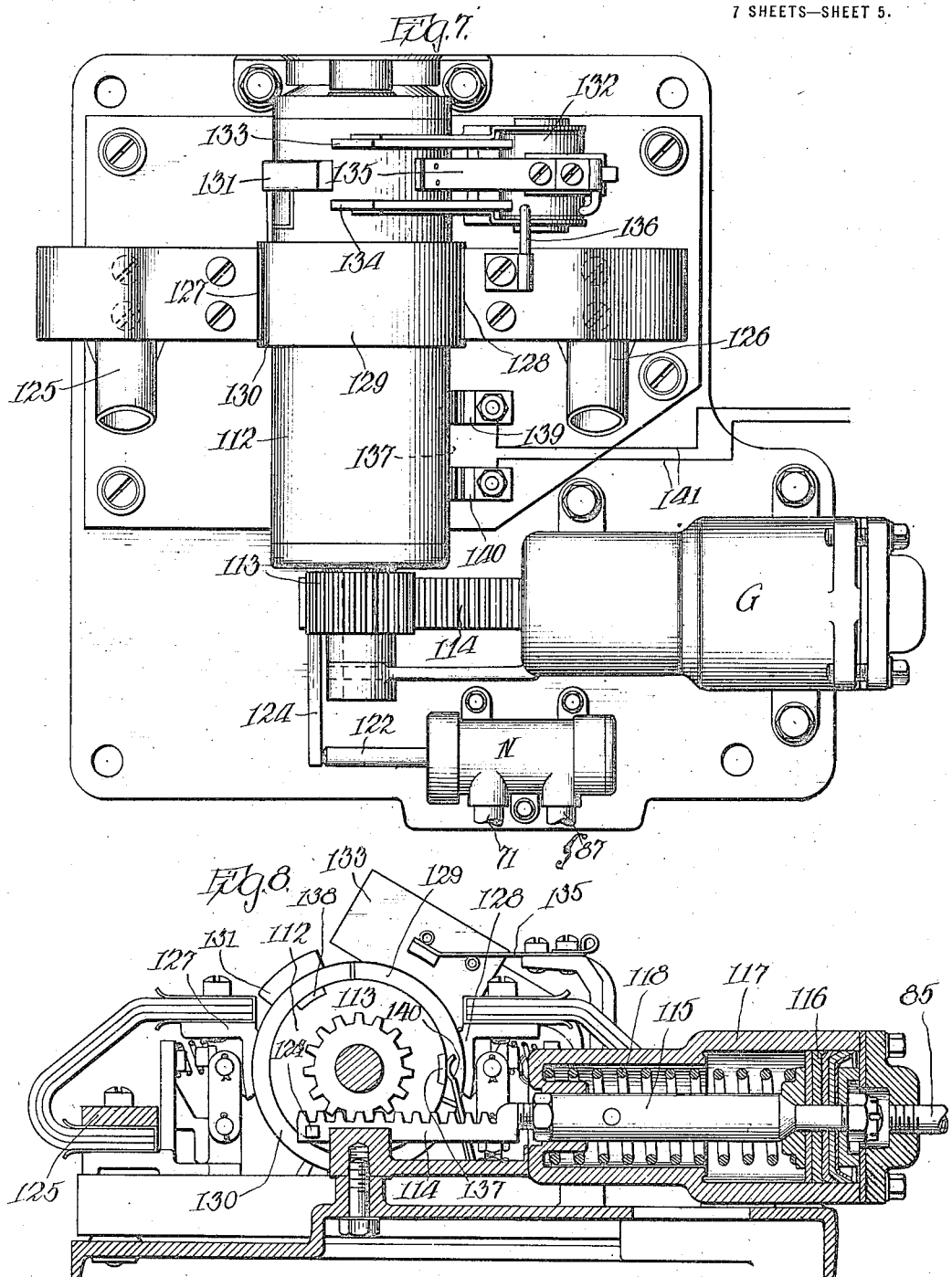

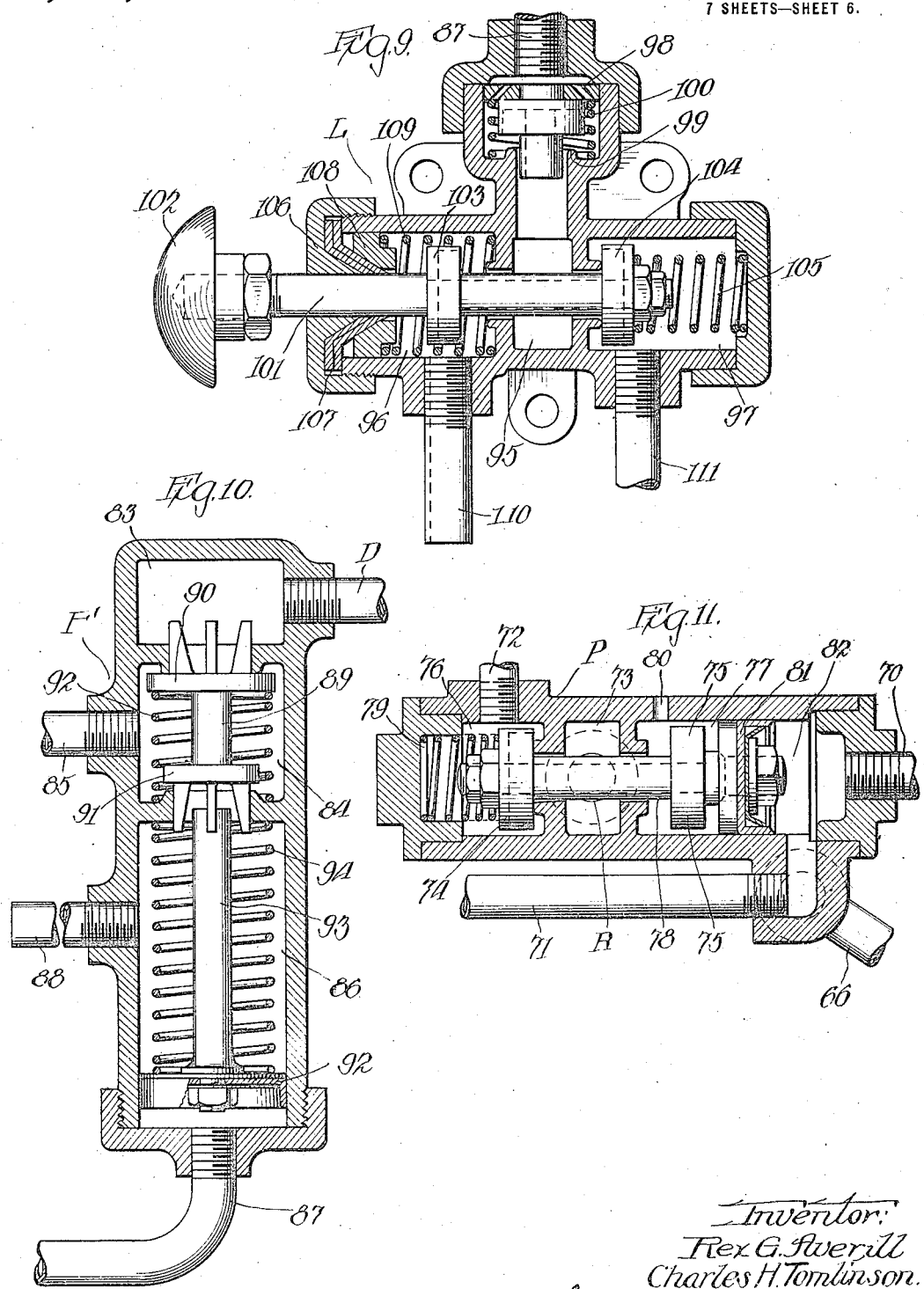

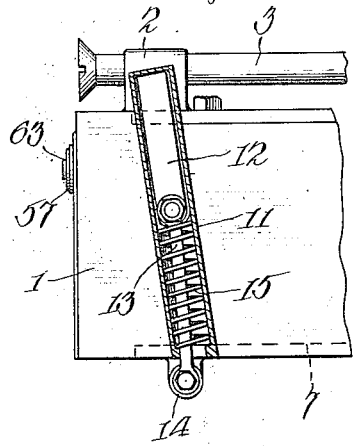
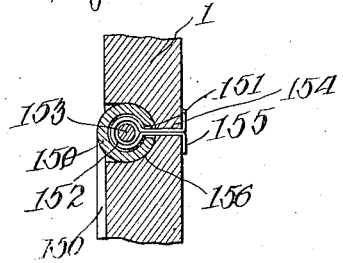
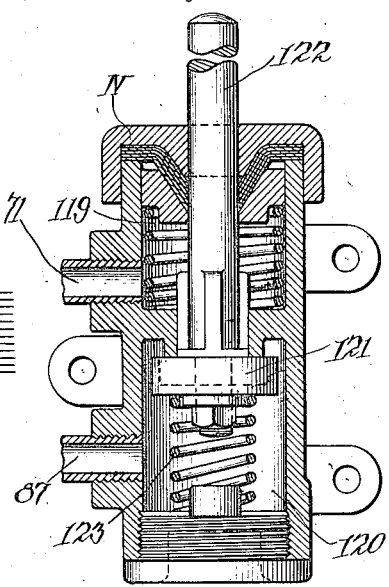
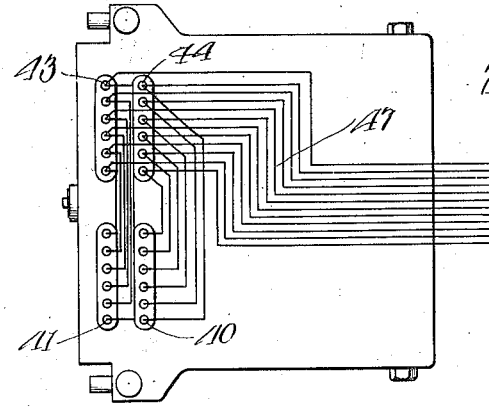
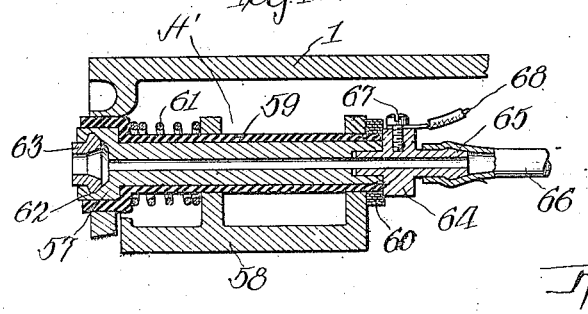

UNITED STATES PATENT OFFICE.

REX G. AVERILL AND CHARLES H. TOMLINSON, OF MANSFIELD, OHIO; SAID AVERILL ASSIGNOR OF ALL HIS RIGHT TO THE OHIO BRASS COMPANY, OF MANSFIELD, OHIO, A CORPORATION OF NEW JERSEY.

MULTIPLE ELECTRIC AIR AND CAR COUPLING.

1,353,557.     Specification of Letters Patent.     Patented Sept. 21, 1920.

Application filed July 7, 1917. Serial No. 179,141.

*To all whom it may concern:*

Be it known that we, REX G. AVERILL and CHARLES H. TOMLINSON, both citizens of the United States, residing at Mansfield, in the county of Richland and State of Ohio, have invented certain new and useful Improvements in Multiple Electric Air and Car Couplings, of which the following is a specification.

This invention relates to a fluid pressure and electric controlled and operated apparatus and coupling system for making a number of electric connections between adjacent ends of a pair of cars so that any number of cars can be connected for simultaneous operation in series. The invention consists in the novelty in the construction, combination and arrangement of the several parts.

In the drawings, Figure 1 is a diagrammatic view of a pair of couplers and their associated operating parts, constructed in accordance with the principles of my invention; Fig. 2 is a sectional view of the multiple electric coupler proper showing its relation to the car couplers and the car coupling air lines; Fig. 3 is a front view of one of the electric couplers; Fig. 4 is a sectional view of an electric coupler with its multiple contactor retracted; Fig. 5 is a side elevation of one of the electric couplers; Fig. 6 is a plan view with the electric contactor retracted; Fig. 7 is a plan view of a bus line switch; Fig. 8 is an end view, partly in section, of the bus line switch; Fig. 9 is a sectional view of the uncoupling valve; Fig. 10 is a sectional view of a check valve; Fig. 11 is a sectional view of the contactor cylinder controlling valve; Fig. 12 is a sectional view of the electric coupler door closing mechanism; Fig. 13 is a diagrammatic view of the electric connections of each electric coupler; Fig. 14 is a sectional view of a combined air and electric connection carried by the electric coupler; Fig. 15 is a section of the end packing; and Fig. 16 is a section of the interlocking valve.

The present invention is intended to be applied to electric trains or to cars having electric control systems which require a number of separate electrical connections between two coupled cars. The present construction usually comprises multiple connector receptacles at each end of a car which requires that an operator must step between each pair of cars to be coupled and connect the receptacles by means of a flexible multiple connector having a plug at each end which he inserts into each of the separate receptacles at the ends of the cars. This is not only dangerous but takes a lot of time, and the contacts are not always surely and uniformly connected. The present invention overcomes these objections by providing a multiple electric coupler which can be operated from the end of either car upon the impact or connection of the car couplers. The operation of the multiple electric connector is therefore independent of the type of car coupler used but it is presumed that with an improved system of this kind a pneumatic coupler will be used which automatically connects the cars upon the impact of the car couplers but which is disconnected by the operation of the fluid pressure car uncoupler device, usually a cylinder and a plunger movable therein. This multiple electric coupler is therefore designed and adapted to be suspended just below the car coupler proper and is made in a rectangular or flat shape so that it extends equally on both sides of the vertical center line in the face of a car coupler with a counterpart contactor and receiver on each electric coupler which are wired in parallel so that when a pair of electric couplers are joined they will make two electrical connections between each electric control line, thereby insuring that a uniform and positive electric connection will be made.

It is believed that the construction and operation of this invention will be best understood by explaining generally the operation of the parts by referring particularly to Figs. 1 and 2, and then to explain the detail construction of each contributing part; upon the impact of a pair of car couplers C the cars will, of course, be connected as will also an air brake line A and a reservoir line B which constitute the brake controlling systems of the connected parts. Air from the reservoir lines therefore passes between the couplers and through piping D and into door cylinders E of each electric coupler, thereby opening the electric coupler doors downwardly as shown in Fig.

2. Air also passes through piping D through the exhaust check valves F and into cylinders G of the bus line switch mechanism and closes both bus line switches. The operator in either of the cars then presses a spring returned electric switch H in one car which completes a circuit through the electric couplers by means of auxiliary contacts H¹ on the faces of both of the electric couplers to a ground connection in the car opposite that from which the switch is closed, thereby raising the electro-pneumatic valves I in both electric couplers allowing air to pass through the electro-pneumatic valves into plunger cylinders J which advances the contactor K from both of the electric couplers simultaneously. These contactors carry a number of electric contact makers which close circuit connections with corresponding receivers K' in each coupler, thereby making a double connection between corresponding electric circuit conductors. At this time the entire coupling operation has been completed which consists in coupling the cars, two main air lines, a combination air and electric line, the opening of four air valves and the doors of the electric couplers, closing two bus line switches, and the connection of a plurality of multiple unit circuits and the bus line circuit, as the bus line is also carried by the contactor K.

In addition to the parts generally referred to in the foregoing description, there is an uncoupling valve L the operation of which allows air to flow through an interlocking valve N controlled by the bus line switch G and admits fluid under pressure to a plunger cylinder controlling valve P which also controls the admission of fluid under pressure through the pipe R to the uncoupling cylinder S of the car coupler. The operation of these parts will be described in connection with the uncoupling operation, but first the detailed construction of the several parts will be set forth.

Each electric coupler comprises a casing 1 which is preferably rectangular in form and is suspended beneath the coupler C by means of perforated lugs 2 (see Fig. 3) through which the rods 3 extend, the rods also passing through a bracket 4 (see Fig. 5) suspended from the coupler C. A nut 5 is threaded on the end of the rod and interposed between it and one of the lugs 2 is a spring 6 which tends to hold the electric coupler 1 in proper position.

Each casing 1 is preferably flat in construction so that there will be ample space for it below the car coupler from which it is suspended. This is one of the principal reasons for making the electric coupler in this shape, for by having the contactor which carries the electric contacts substantially flat or wedge-shaped it will not take up too much room below the coupler but will still leave sufficient clearance between the bottom of the electric coupler and the ground.

At the front end of each electric coupler, is a door 7 which covers the lower portion of the front face of the coupler and extends below the bottom of the coupler but is hinged on pivots 8 at the rear of the cover. Inside of each electric coupler is the door opening cylinder E which has a plunger 9 movable therein with a plunger rod 10 which presses the door 7 downwardly, opening it, when air is admitted at the other end of the cylinder E. In order to return the door the casing 1 is provided at the sides with tubular members 11 (see Figs. 3 and 12) each of which is provided with a plunger 12 to which one end of a rod 13 is pivoted, the other end of the rod being attached, as shown in Fig. 3, to a bracket 14 at the under side of the door 7. In each of the tubular members 11 is a spring 15 which tends to close the door 7 as soon as the upper portion of the door cylinder E is opened to exhaust. The top of each door cylinder E is connected with the main reservoir line B through the tubular connection D between the coupler end of the line B and its valve 15, as clearly shown in Fig. 2. The outer end or coupler end 16 of the air line B is slidable in the depending lugs 17 of the coupler C and is pressed outwardly from the face of the coupler by the spring 18. The other end of this movable portion makes an air-tight connection with a packing gland 19 which comprises inclined washers 20 engaged by a ring 21 and pressed in place by a spring 22 which bears against the seat of valve 15. This valve has a spring 23 tending to hold it on its seat with a guide 24 on one side and projecting guides 25 on the other side which are engaged by the end of the movable member 16 when the movable member contacts with the corresponding movable member of a counterpart coupler, thus opening the valve 15. Opening the two valves 15 admits fluid under pressure between the valves and therefor admits fluid under pressure through the pipe lines D to the door opening cylinders E.

Back of each door opening cylinder E is an electro-pneumatic valve I connected by means of a pipe 26 with an opening 27 in the door opening cylinder E at such a distance from the top of the cylinder E that its plunger 9 must be entirely down, that is, holding the door 7 in open position before fluid under pressure will be admitted through the aperture 27 to the pipe 26. The electro-pneumatic valve comprises a winding 28 which controls a core 29 having a stem carrying the opposite valves 30 and 31. The pipe 26 is connected below the lower valve 30 of the valve I. An air vent 33 opens above the upper valve 31, and a pipe 34 connected intermediate the valves leads to the rear of the plunger operating cylinder J. When one valve is seated the other is unseated, and energizing the winding 38 unseats the valve 30 against a valve spring 32 which opens communication from the door cylinder E to the plunger operating cylinder J, in both couplers at the same time. When the valve 31 is unseated by the spring, which occurs when the operator releases the push button H, the air in cylinder J exhausts to atmosphere through port 33. In fact, only the bus line switches and the door cylinders are held by air pressure during operation.

One of these cylinders J is shown in section in Fig. 2 and comprises a piston 35 with a rod 36 connected at its outer end to an insulating block K which is inclined on its upper face toward the end thereof so that the outer end is thinner than its inner end.

Each connector block K is provided with connectors 37 and 38 each provided with two contacts which extend above the inclined surface of the top of the block, the connectors being substantially U-shaped in construction and placed one within the other but insulated from each other and each pressed upwardly by springs 39 preferably at the ends of the members. (See Fig. 4). It is to be understood that there are a number of these connectors 37 and 38 in a row in the upper face of the contactor block K so that as many connections can be made by each contactor block as there are separate connectors. In the retracted position, as shown by Fig. 4, the connectors 37 and 38 are free from actual connection, but positioned directly above the outer end of the block K are two sets of contacts 40 and 41 which are rigidly held in place by bolts 42 or other suitable means and the lower faces of these contacts are inclined to correspond with the inclination of the contactor block and are suitably spaced therefrom so that only the rear ends of the connectors 37 and 38 make electrical connection with the contacts 41 and 40 respectively.

On the opposite side of the vertical center line are fixed contacts 43 and 44, as clearly shown in Fig. 2, so that when a contactor block K is projected from one electric coupler into the other an electric circuit will be closed from contacts 41 to contacts 43 by means of connector 37, and from contacts 40 to 44 by means of connectors 38.

At the bottom of each contactor block K is a bus line conductor 45 preferably in the form of a leaf conductor fastened at the center. At the bottom of each coupler casing is a fixed leaf contactor 46 against which the conductor 45 bears to make electrical connection. When the block 12 is retracted the outer end of the bus line connector 45 is in engagement with the contact 46 of its own electric coupler, but when the block K is projected the inner end of the contactor is in communication with its own fixed contact 46 so that it bridges the contacts 46 between the adjacent couplers.

It should be understood that it is the intention to connect the corresponding fixed contacts 41 and 43, and 40 and 44, on opposite sides of a vertical plane or center line of each coupler, so that the contacts will be connected in parallel. This is indicated by the diagrammatic view shown by Fig. 13 in which it will be observed that the outermost contacts 40 and 44 are connected in parallel and likewise all of the other corresponding contacts. The object of this invention, as previously stated, is to make a double connection for each conductor 47. The bus line contactors are similarly connected in parallel so that a double connection is made between them, each contact 46 being connected to a common terminal 54, as shown in Fig. 6, by means of a conductor 55, the terminal 54 then being connected by means of a suitable conductor with the bus line switch.

At the sides of the casing are guides 48 (see Fig. 3) in which the contactors K are slidable, the edge 49 of the receiving guide being beveled so that the contactor block K will slide in it more easily. In order to hold the contactor block K in its forward or projected position a guide rod 50 (Fig. 6) is positioned in the casing just above the block and is formed at its forward end with a notch 51. Carried by the block is a projection 52 in which is a spring-pressed pawl 53 for engaging the notch 51 and holding the contactor block K in its forward or projected position until it is positively retracted by its operating cylinder J.

Carried by each electric coupler is a combined air and electric connector H', one of which is shown in detail by Fig. 14. It comprises a perforated conductor 57 slidable in a bracket 58 and insulated therefrom by insulation 59 with a collar 60 at one end and a spring 61 at the other tending to force it outwardly from the face of the electric coupler, the collar 60 preventing it from protruding too far. In the outer face of the conductor 57 is a recess 62 in which is a washer 63 for making a fluid-tight connection with a counterpart connector, and at the rear end is a contact member 64 which has a knob 65 for the attachment of a flexible hose 66 and a terminal screw 67 for the attachment of a conductor 68. This conductor 68 is connected to one end of the winding 28 of the electro-pneumatic valve I and the other end of the winding is connected by means of a conductor 69 to a two-pole switch H, which in one position connects the conductor 69 to ground and in the other position to a source of electrical supply. It is obvious, therefore, that when two electric couplers are connected the connection of one switch H with the source of electrical supply will energize both electropneumatic valves which will operate them simultaneously, as previously explained.

In each electric coupler is a plunger cylinder operated valve P, which is shown in detail in Fig. 11. It is connected to the front end of the operating cylinder J by means of a pipe 70 and is connected by means of the tubular connector 66 with the combination air and electric connector H'. Also connected to the same end of the valve as the tubular member 66 is a pipe 71 which leads to the interlocking valve N. At the other end of the valve P is a tubular connector 72 which opens into the cylinder J at a distance from the rear end thereof slightly greater than the thickness of the piston 35 so that when this piston is fully retracted fluid under pressure can pass through the tubular member 72 into the valve P. Within the valve is a central chamber 73 which is connected by means of a tubular member R with the uncoupling cylinder S. At each side of the chamber 73 are partitions forming seats for valves 74 and 75 to separate the chamber 73 from the chambers 76 and 77 respectively. The valves 74 and 75 are mounted on a stem 78 so that when one valve is seated the other is unseated and a spring 79 tends to continuously seat the valve 74 leaving the chamber 73 connected with the chamber 77 through the space surrounding the valve stem 78. In this chamber 77 is an atmospheric passage 80 and also carried by the valve stem is a valve 81 which closes the chamber 77 from a chamber 82 at the end of the valve P, and with this latter chamber 82 the tubular members 66, 70 and 71 are connected. It is obvious that when fluid under pressure is admitted to the chamber 82 the valves will be moved against the pressure of the springs 79 to seat the valve 75 and to unseat the valve 74. This will open the pipe R to fluid under pressure from the cylinder J when the piston 35 has been retracted sufficiently to uncover the tubular member 72 so that fluid under pressure can flow past the valve 74. This insures that the contactor block K will be retracted before the uncoupling cylinder S can be energized by fluid under pressure.

When fluid under pressure is admitted to the tubular connection D upon the impact of the couplers it flows directly through the check valve F, which is shown by Fig. 10. This valve has a chamber 83 with which the tubular connection D is connected; a chamber 84 which is connected by means of a pipe 85 with the cylinder of the bus line switch G; and a chamber 86 which is connected at one end by means of a pipe 87 with the uncoupling valve L, and at a distance from the end has a pipe 88 for exhaust for atmospheric connection. In the chamber 84 is a member 89 having valves 90 and 91 to close the chamber from the chambers 83 and 86 respectively, and with a spring 92 which tends to seat the valve 90 allowing a free passage from the pipe 85 around valve 91 to the atmospheric outlet 88. Fluid under pressure admitted to the chamber 83 will open the valve 90 and close the valve 91 thereby admitting fluid under pressure to the pipe 85 and to the bus line switch cylinder. In the chamber 86 is a valve 92 having a stem 93 which projects adjacent the valve 91 and with a spring 94 tending to press the valve in a direction away from the valve 91. The admission of fluid under pressure to the pipe 87, however, will compress spring 94 moving the stem 93 against the valve member 89 and if the valve 90 is not already closed the additional pressure produced by the valve 92 will close it, thereby opening the pipe 85 and the bus line cylinder to exhaust around the valve 91 through the pipe 88.

An uncoupling valve L is located in each car and comprises a housing (see Fig. 9) with a middle chamber 95 and end chambers 96 and 97. Communicating with the middle chamber is a check valve 98 having a seat 99 and a spring 100 which normally presses the valve from its seat but prevents a sudden rush of fluid under pressure in the other direction. A valve stem 101 extends from one end of the housing and has a knob 102 at the outer end. It carries valves 103 and 104 on opposite sides of the chamber 95 so spaced apart that when one valve is seated the other is unseated, a spring 105 normally seating the valve 104 in the chamber 97. A packing gland 106 surrounds the stem 101 and packing members 107 are inclined forwardly toward the stem making an angular contact with it. They are held in this position by means of a ring 108 and spring 109 which bears against the ring. Connected to chamber 96 is a pipe 110 which forms an atmospheric exhaust, and connected with chamber 97 is a pipe 111 which is connected to the pressure reservoir or the source of fluid pressure supply. When the knob 102 is pressed fluid under pressure is admitted from the pipe 111 through the chambers 97 and 95 and through the valve 98 to the pipe 87 which connects the uncoupling valve both with the check valve F and the interlocking valve N.

The bus line switch G comprises a rotatable drum 112 (see Figs. 7 and 8) which carries a gear 113 at one end with which a rack 114 meshes. This rack is a prolongation of a rod 115 having a piston 116 at the other end movable in a cylinder 117. The pipe 85 from the check valve F is connected to the cylinder 117 at its end and tends to force the piston 116 and the rack 114 in the other direction so that the drum 112 is rotated. This motion is opposed by a spring 118 disposed within the cylinder 117 which is operative to return the piston to its original position, and consequently to rotate the drum 112 as soon as pressure is relieved from the end of the cylinder.

Adjacent the cylinder 117 is the interlocking valve N (see Figs. 1 and 16) which is connected to the pipe 87 which extends from the uncoupling valve L to the check valve F. The interlocking valve also has a connection with the pipe 71 which extends to the plunger operating valve P. This valve N comprises two chambers 119 communicating with the pipe 71, and 120 communicating with the pipe 87. In this latter chamber is a valve 121 having a seat therein and a stem 122 which extends through the other chamber 119 and out of the end of the valve with a spring 123 tending to hold the valve on its seat in the chamber 120. Carried by the rack 114 is an arm 124 which is adapted to engage the extremity of the stem 122 when the rack is retracted, thereby raising the valve 121 from its seat against the tension of spring 123 and allowing a free passage for fluid under pressure from the pipe 87 through the valve to the pipe 71.

The bus line switch proper comprises two terminals 125 and 126 which have connected contacts 127 and 128 respectively, adapted to bear against the drum 112. A portion of the drum surface is provided with insulation 129 and the other portion with a connecting conductor 130 which makes electrical connection between the contacts 127 and 128 when the drum is in the position caused by the outward movement of rack 114. In the operation of this apparatus the bus line switch is always opened before the electric couplers are separated, for this device is designed and intended to be operated to the uncoupling position while the cars are standing still, and while the main platform motor controllers are, of course, open circuited. In fact, no current is flowing through the bus line to the motors. But all multiple unit cars have a motor driven compressor, lighting circuits, and in some cases heating circuits, so it may happen that when the bus line switch is opened, a comparatively small current may be flowing through the bus line conductor of the electric coupler, which may amount to 50 amperes of a 600 volt current. For this reason a magnetic blow-out is provided in connection with the bus line switch to handle this current as an auxiliary to the bus line contactors. A circuit breaker of sufficient capacity to handle the motor current, at the same time, which very often exceeds 1000 amperes at 600 volts, would cost as much as the entire electric coupler.

The magnetic blowout comprises a contact 131 carried by the drum 112 and connected with the contact 130 which is in connection with one of the contacts 127 at all times, it being moved into connection with the other contact 128 in closing the bus line switch. A magnet winding 132 is mounted at the side of the drum 112 adjacent the contact 128 and has poles 133 and 134 which extend adjacent the drum with a terminal 135 between them forming one end of the electrical connection for the winding 132, the other end of the magnet winding 132 being connected directly to the terminal 128. When the bus line switch is closed the contact 131 carried by the drum makes electrical connection with the terminal 135 between the poles 133 and 134. When the bus line switch is opened, the separation of the contact 131 from the contact 135 will tend to cause an arc. If any of the energized circuits of the electric coupler happen to be receiving current the magnetic blowout thereupon prevents destructive arcing by the action of the magnetic flux between the poles 133 and 134.

There are some accidental conditions which must be taken care of, such as; accidental uncoupling of the car couplers proper, or failure or breaking of the air pipe line, or the compressor, while the cars are moving and taking 1000 amperes or more current, as it is contemplated that all the current may be taken from one trolley pole or one third rail shoe for the operation of the entire train.

To provide for these accidental cases, it will first be observed that the bus line switch has two positions; an open position and a closed position. In any intermediate position there is danger of a wrong connection or position of the controlling parts and therefore the drum is provided with contact plates 137 and 138, both of which are adapted to make connection between spring contacts 139 and 140 fixed at the side of the drum. These contacts are connected by conductors 141 with a circuit breaker 142 which can only be maintained in a closed position when it is energized and can only be energized when the contacts 139 and 140 are bridged by the plates 137 and 138; that is, when the bus line switch is either entirely open or entirely closed. In any other position the circuit breaker is opened.

In further explanation of the circuit breaker, it may be said that every car equipped for multiple unit train operation has a switch group interposed between the controller and motors (not shown in this case) and in this switch group is a line switch or circuit breaker of sufficient capacity to handle any current required by the motors. This circuit breaker is represented by the breaker 142 in Fig. 1, and as shown has an electrically operated catch which is controlled by a winding 162. It is intended that the circuit breaker be held in when current flows through the winding 162, so the invention in this part of the apparatus is to use the contacts 139 and 140 to make and break a small current to open and close the circuit breaker energizing coil circuit, in case of accidental uncoupling while the motors are using power, either by the car couplers parting or by interruption of air pressure.

In the operation of automatic air brakes, the brake pipe line, which is connected to the pipe represented by A in Fig. 2, has a constant pressure which holds triple valves on the various cars of the train closed, so that no air can pass from an auxiliary reservoir into a brake cylinder unless the operator exhausts some of the air in the brake pipe line to the atmosphere, which causes the triple valves to move and permits the air from the several auxiliary cylinders to pass into the brake cylinders and apply the brakes. This same operation occurs when a train breaks in two and opens the brake line. This is why brakes of this type are called "automatic brakes," and this is the reason a self-closing valve cannot be used on the brake air line A, as it would prevent the escape of air (if the couplers parted accidentally), which is necessary to apply the brakes automatically.

It will be observed therefore, upon reference to Fig. 2, that the brake line A has a valve 143 opened by a movable portion 144 of the brake pipe which operates similarly to the valve 14 and the movable member 16 of the reservoir line B. This valve 143 has centering wings 145 for raising it from its seat by contact with the member 144 and on the opposite side it has a stem 146 which extends into a cylinder 147 and carries a piston 148. Connected to the end of this cylinder is a pipe 149 which constitutes an extension of the pipe R (Fig. 1) which leads to the uncoupling cylinder S. Upon impact of the couplers the valve 143 is positively opened and is held open as long as the cars are coupled. As soon, however, as the cars are uncoupled fluid under pressure is admitted through the pipe 149 tending to seat the valve 143.

In the face of each electric coupler is a packing 150 which extends from the top downwardly at the sides of the front of the electric coupler casing projecting slightly from the face of the coupling so that when two adjacent electric couplers are connected the packings will abut forming a water-tight connection to protect the contacts and contact makers. The enlarged section shown by Fig. 15 illustrates the manner of securing the packing in place. The packing proper comprises a piece of flexible hose or similar material which is provided with perforations 151 through which the head 152 of a cotter pin is inserted and then a wire 153 inserted through the heads of the cotter pins holds them in place. The projecting ends of the cotter pin are then inserted through an opening 154 in the wall of the casing and the extremities 155 are bent over on the inside thereby holding the packing in place, preferably in a groove 156 in the face of the casing provided for that purpose.

As clearly shown in Figs. 3 and 5, the rear of each casing is provided with a projection 157 which fits under the reservoir pipe line B and forms an outlet for the bus line cable and also for the several electrical conductors 47 which are also connected in the form of a cable for economizing space.

A diagrammatic arrangement of the bus line connection is shown in Fig. 1 and comprises a bus line conductor 158 which is connected through a circuit breaker 142 to one of the terminal lugs 125 and is then connected by the bus line switch through the other terminal 126 with a conductor 159. In the coupler the conductor 159 is divided into two conductors 160 which terminate in contacts designated by the reference numerals 46 in the detail drawings (Figs. 2 and 4). The terminals of the conductors 160 are connected by a contact maker 161 which corresponds to the bus line connector 45 shown in Figs. 2 and 4. The circuit for controlling each circuit breaker 142 comprises the conductors 141 which are connected to the contacts 139 and 140, one of the conductors leading to a positive source of electrical supply and the other conductor leading through an energizing winding 162 for the circuit breaker and thence to ground. From this it is obvious that the bus line switch will allow the circuit breaker to be closed only when the contacts 137 or 138 are in proper position and that therefore the bus line can be connected through the electric couplers only when the contractors K are both advanced and when the bus line switches are both closed. Of course, as soon as either bus line switch is opened the bus line receives no current and the subsequent separation of the electric couplers will cause no sparking at the coupler terminals.

The operation of connecting electric couplers was briefly described at the beginning of the specification. Upon the impact of the couplers C the valve 15 of the reservoir line B and the valve 143 of the brake line A are opened. This allows fluid under pressure from one or both of the car pressure reservoirs to pass between the couplers which admits fluid under pressure through the pipe D to the door cylinders E which open the door 7 of both couplers. When the piston 9 is down, as shown in Fig. 2, the aperture 27 is uncovered which allows fluid under pressure to pass by way of the pipe 26 to the electro-pneumatic valve I. In each electro-pneumatic valve the valve 31 is normally held open and valve 30 closed by spring 32 so that fluid under pressure in the pipe 34 escapes through the atmospheric outlet 33. As soon, however, as both electro-pneumatic valves are energized by the closing of one of the switches H the valves 31 are closed and the valves 30 are opened which admits fluid under pressure from the pipes 26 through the pipe 34 which communicates with the opening 32, to the rear end of the plunger cylinders J. This projects both contactor devices K making the several electrical contacts in parallel also connecting the bus lines in parallel. At this time fluid under pressure cannot pass through the plunger cylinder operating valve P for even if fluid under pressure is admitted through the pipes 72 to the chamber 76 of the valve P the valve 74 is closed. Fluid pressure is admitted, however, to the chamber 83 of the valve F and thence it passes through the valve 90 compressing the spring 92 and through pipe 85 to the bus line cylinder 117 compressing the spring 118 and operating the bus line switch drum 112. When the bus line switch plunger rod 115 is retracted the valve 121 of the interlocking valve N is open but no fluid under pressure passes through it for the reason that the uncoupling valve L is closed and the check valve F prevents the passage of fluid under pressure to the valve N at all times. As soon, however, as the bus line switch drum is operated to close the switch the rod 124 is moved out of engagement with the stem 122 of the valve N which allows the valve 121 thereof to close under the action of its spring 123.

Under these conditions the contactors K will be locked in position by the spring-pressed pawls 53 which coöperate with the notches 51 of the rods 50, the doors 7 will be held in open position by constant pressure from the reservoir pipe D, but this fluid under pressure cannot pass the electro-pneumatic valve, unless the push button H is operated. Likewise one of said electro-pneumatic valves cannot be operated unless connected to another of the same type, as there would be no ground connection.

Uncoupling: In order to effect the uncoupling operation, an operator in either one of the cars presses the knob 102 of the uncoupling valve which closes the valve 103 and opens the valve 104 allowing fluid under pressure to pass from the pipe 111 which is connected to the source of fluid pressure supply past the valve 104 and past the check valve 98 into the pipe 87. This pipe 87 leads both to the interlocking valve N and to the check valve F. The interlocking valve is closed, for the valve 121 is held on its seat by the spring 123 so the fluid under pressure passes to the end of chamber 86 of the check valve and moves the piston 92 inwardly until its stem 93 opens the valve 91 and closes the valve 90. This opens the bus line cylinder 117 to exhaust through the pipes 85, valve 91, chamber 86 and exhaust pipe 88 which allows the spring 118 to retract the plunger 115 and the operating rack 114 which moves the contact plate 138 out of engagement with the contacts 139 and 140 thereby opening the bus lines circuit breaker and the bus line switch. As soon as the rack 114 is retracted the rod 124 engages the stem 122 of the interlocking valve N, thereby opening its valve 121 and allowing fluid under pressure to pass from the pipe 87 through the interlocking valve to the pipe 71 which is connected to the forward end of the plunger cylinder operating valve P. Fluid under pressure then passes immediately through the pipes 66 of the combined air and electric connectors H' and from the forward ends of both of the plunger cylinder operating valves P to the forward ends of the plunger cylinders J. The admission of fluid under pressure to the chamber 82 of each valve P presses the stem 78 rearwardly thereby opening the valve 74 and closing the valve 75. As soon as the plunger 35 in each plunger cylinder J is sufficiently retracted a pipe 72 is opened for the passage of fluid under pressure from the front of the cylinder J. This fluid under pressure passes through the chamber 76 of the valve P past the valve 74 and through chamber 73 to the pipe R which is connected to the uncoupling cylinder S. As this action occurs in both of the electric couplers the uncoupling action is effected simultaneously in both cars. Fluid under pressure also is conveyed by means of the pipes 149 to the chambers 147 at the ends of the brake lines A and there acting upon the pistons 148 the valves 143 are both closed.

After this action both of the contactors K are retracted, the bus line and the other electrical connections are opened, the bus line switches are opened and the electric couplers are in condition to be again connected with the same or different cars.

With this construction it is obvious that the coupling and uncoupling actions are both completed entirely from within the cars, and from either car; the operations take place in regular order and are all properly safe-guarded; it is impossible to uncouple mechanically before the electrical uncoupling is effected and the operation is therefore entirely safe and fool proof.

As the cars part it is apparent that the valve 15 of the reservoir line B closes automatically by the action of its spring; the brake line valve is closed as before described, and thus the check valves in both the reservoir and brake lines of both car couplers are closed. The air between these valves will exhaust to the atmosphere, and likewise the air which is in the door cylinders E of both electric couplers, allowing the doors 7 to close by the action of the springs at the side of the electric couplers. The air will also exhaust from the pipe D to the atmosphere. It is then apparent that all parts are in their normal positions and that the bus line contactors, the multiple unit and signal circuits in both of the electric couplers are open-circuited ready for another operation.

I claim:

1. In a coupler of the class described, a horizontal casing having a door pivoted at the rear end of the casing and covering the front end thereof which door may be swung downwardly while said coupler is in coupled position relative to a coöperating coupler to uncover said front end.

2. In a coupler of the class described, a horizontal casing having a door at the front end pivoted on an axis behind the longitudinal center of the casing to permit said door to swing into open position after said coupler has been brought into coupled position.

3. In a coupler of the class described, a casing having a single door at one end pivoted at the rear of the longitudinal center of the casing, and a fluid pressure device intermediate the door and its pivot point for opening the door.

4. In a coupler of the class described, a casing having a single door at one end pivoted at the rear of the longitudinal center of the casing, a fluid pressure device for opening the door, and means for closing the door.

5. In a coupler of the class described, a horizontal casing having a door covering the front of the casing, which is pivoted at the rear of the longitudinal center of the casing and swings downwardly below the casing in opening, a fluid pressure device for opening the door, and resilient means for closing the door.

6. In a coupler of the class described, a horizontal casing having a door at the front thereof pivoted at the rear of the longitudinal center of the casing and opening downwardly below the casing, a fluid pressure device for opening the door, and springs at the sides of the casing for closing the door.

7. In a coupler of the class described, a downwardly opening door, fluid pressure means for opening the door, a projectable contacting device and a fluid pressure connection which is operated upon impact with another coupler to operate the door opening device independently of said contacting device.

8. In a coupler of the class described, the combination with a pivoted door therefor, of a fluid pressure device for opening the door, a projectable contacting device, a fluid pressure connection projecting from the face of the coupler and operated upon impact with a counterpart coupler to open a fluid pressure connection to the door opening device for operating the door independently of said contacting device.

9. The combination with a pair of counterpart couplers each having a door which opens downwardly, of a fluid pressure device in each coupler to open the door, a contacting device projectable from each coupler door, and a fluid pressure line having a portion which extends beyond the face of the coupler, and a valve operated by said portion upon impact with a counterpart portion to open connection to the fluid pressure device for opening both doors upon the impact of a pair of couplers independently of said contacting device.

10. In combination, two cars having counter-part couplers, a reservoir line connected to a suitable source of fluid pressure supply having a movable portion projecting beyond the face of the coupler and a valve operated by said movable portion, a door for each coupler, a fluid pressure device for operating the door, a contacting device projectable from each coupler door, and a tubular connection from the fluid pressure device to the movable portion of the fluid pressure line between the valve and the protruding end thereof whereby both fluid pressure devices are energized to operate the doors free from engagement by said contacting devices as soon as the two couplers are brought together.

11. In a coupler of the class described, a casing having portions disposed on opposite sides of a vertical plane, and a movable contactor in the casing on one side of the said plane having a plurality of contacts arranged on the upper face of the contactor in parallel rows, said contactor being arranged to make a different connection by means of each contact of each row.

12. In a coupler of the class described, a movable contactor having an inclined upper face and a plurality of contacts mounted at different elevations in the said inclined face.

13. In a coupler of the class described, a movable contactor and a plurality of electrical connectors with contacts having inclined contact faces at different elevations in the upper face of the contactor.

14. In a coupler of the class described, a movable contactor having one face inclined to the plane of movement of the contactor, and a plurality of electrical contacts at different elevations in the said inclined face.

15. In a coupler of the class described, a projectable contactor having a face inclined to its plane of movement and electrical connectors mounted in the inclined face thereof, each having two contacts one at a different elevation than the other.

16. In a coupler of the class described, a projectable contactor having an upper face inclined to the plane of movement thereof, and a plurality of spring pressed electrical connectors disposed in the inclined face of the contactor, each connector having two contacts at different elevations above the plane of movement of the contactor.

17. In a coupler of the class described, a movable contactor having its upper face inclined to the plane of movement thereof, and a number of electrical connectors arranged in pairs one within the other and each connector having two contacts spaced apart and located at different distances above the plane of movement of the contactor.

18. In a coupler of the class described, a movable contactor, a plurality of electrical connectors mounted on one side of the contactor, each having two contacts one of which is at a higher elevation than the other, and means for engaging each of the contacts when the movable contactor is projected in one direction.

19. In a coupler of the class described, the combination with a movable contactor having one face inclined to the plane of movement thereof, a plurality of electrical connectors arranged in pairs in the line of movement of the contactor, one connector having its contact projecting above the inclined face of the contactor at a different distance from the end than the other.

20. In a coupler of the class described, a movable contactor having an inclined face and plurality of electrical connectors arranged in pairs in the line of movement of the contactor, each connector having two contacts and the contacts of one pair being positioned between the contacts of the other connector of the same pair.

21. In a coupler of the class described, a projectable contactor having an inclined face and a plurality of connectors arranged in pairs, each connector having two contacts spaced apart and one connector being situated within the other, the contacts of all the connectors being in the plane of projection but arranged at different elevations above the horizontal plane of projection of the contactor.

22. In a coupler of the class described, a projectable contactor having a plurality of electrical connectors arranged in transverse and longitudinal alinement each connector comprising two contacts and the contacts of each transverse line being at the same elevation but different than the elevations of the other transverse lines of contacts.

23. In a coupler of the class described, a projectable contactor having an inclined upper face and a plurality of electrical connectors arranged in pairs in transverse alinement, each connector having two contacts which project slightly above but conform in inclination to the inclined face of the contactor.

24. In a coupler of the class described, a projectable contactor having an inclined upper face, a plurality of pairs of electrical connectors transversely alined in the upper face of the coupler, and connectors each having contacts which normally project above the inclined face but conform in inclination thereto, and means for engaging the contacts of the connectors when the contactor is projected forwardly.

25. In a coupler of the class described, a movable contactor having an inclined upper face, a plurality of spring pressed electrical connectors mounted in the inclined face of the contactor and each having two contacts which project above but conform in inclination to the upper face of the plate, and means also conforming in inclination to the inclined face of the contactor for engaging the respective contacts when the contactor is moved forwardly.

26. In a coupler of the class described, a movable contactor at one side of a center line of the coupler, a plurality of electrical connectors each having contacts at different transverse elevations at one face of the contactor, means for engaging the rearmost contact of each connector when the contactor is projected forwardly, and means at the other side of the vertical center line for engaging the outermost contact of an electrical connector when a counterpart contactor is forwardly projected.

27. In combination, a pair of couplers of the class described each comprising a movable contactor on one side of the center line having a plurality of electrical connectors each comprising two contacts one at a different transverse elevation than the other, a plurality of fixed contacts adjacent the contactor to engage the rearmost contacts of each connector when the contactor is forwardly projected, a plurality of fixed contacts at the other side of the center line of the coupler to engage the outermost contacts of each connector when the contactor of the counterpart coupler is projected forwardly, and electrical connections between the respective contacts to make a double connection between the couplers for each corresponding pair of the electrical connectors.

28. In a coupler of the class described, the combination with a projectable contactor having a face inclined to the plane of projection, spring pressed electrical connectors mounted in the inclined face of the contactor, each connector having a pair of contacts extending above but conforming in inclination at the outer end to the inclined face of the contactor, and contacting means to engage the contacts of the connectors and to press them substantially flush with the inclined face of the contactor.

29. In a coupler of the class described, a movable contactor having one face inclined to the plane of movement of the contactor, a plurality of electrical connectors mounted in the inclined face of the contactor and having contacts at different elevations from the plane of movement, means for engaging the said contacts and a single electrical connector carried on the other face of the contactor to make a bus line connection.

30. A pair of counterpart couplers each comprising a projectable contactor having one face parallel with and the opposite face inclined to the plane of movement of the contactor, a plurality of electrical connectors mounted in the inclined face of the contactor, each one making a separate electrical connection between the counterpart couplers, a single bus line connector mounted on the parallel face of each contactor, and electrical connections in each coupler for making double electrical connections for each of the separate circuits served by the separate connectors and double bus line connection, when the contactors of both couplers are forwardly projected.

31. In a coupler of the class described, a pivoted front door, a fluid pressure door opening device, a movable contactor, means for projecting it forwardly, and means to prevent the projection of the contactor until the door has been opened by the door opening device.

32. In a coupler of the class described, the combination with a pivoted door, of a fluid pressure door opening device, a movable contactor, a fluid pressure device for projecting it forwardly through the door, and means operative at will to project the contactor after the door has been opened by the door opening device.

33. In a coupler of the class described, a pivoted door, fluid pressure means for opening the door, a fluid pressure connection to energize said means upon contact with another coupler, a projectable contactor movable through the door, and means to project the contactor at will when the door is open.

34. The combination with a pair of counterpart couplers each having a pivoted door, of a fluid pressure device in each coupler to open the door, a fluid pressure line engageable upon impact of the couplers to operate the door opening device, projectable contactors in each coupler and a device to prevent the operation of the projectable contactors until after the doors are opened and then operable at will to project the contactors simultaneously.

35. The combination with a pair of counter part couplers each having a pivoted front door which opens downwardly, a fluid pressure door opening device, a fluid pressure line having a valve opened upon contact of the couplers to energize the said door opening device, a movable contactor, a fluid pressure projecting device, an electro-pneumatic valve in each coupler to open a fluid pressure connection to the contactor, projecting means after the doors are opened, and an electrical circuit which may be closed through both couplers to energize both electro-pneumatic devices for projecting the contactors simultaneously.

36. In a coupler of the class described, a fluid pressure door opening device, a movable contactor, a fluid pressure projecting device for the contactor and an electro-pneumatic valve for connecting the door opening device with the projecting device, the connection with the door opening device being open only when the door opening device is in the door opening position.

37. In a coupler of the class described, the combination with a movable door, of a door opening cylinder and plunger, fluid pressure means operable subsequent to the operation of the door opening device, and means for preventing the operation of said fluid pressure means until after the door is open, said last named means comprising a tubular connection with an opening into the door opening cylinder just above the plunger thereof when the plunger holds the door entirely open.

38. In a coupler of the class described, a door opening cylinder and a plunger movable therein, an electro-pneumatic valve having a tubular connection with the door opening cylinder at a distance substantially equal to the thickness of the plunger from the end thereof, to insure the complete operation of the door opening cylinder when the electro-pneumatic device is operated.

39. In a coupler of the class described, a movable door, a door opening cylinder and plunger therefor, a contactor movable through the door opening, a fluid pressure device for moving the contactor through the opening, an electro-pneumatic valve having a tubular connection with the door opening cylinder at a distance from the end thereof substantially equal to the thickness of the plunger and with an atmospheric outlet, the said electro-pneumatic valve being operable to close the atmospheric outlet and to admit fluid under pressure from the door opening cylinder to the fluid pressure device for projecting the contactor.

40. In a coupler of the class described, the combination with a movable contactor, of spring pressed connectors carried thereby, fluid pressure means for positively moving the contactor in both directions, a bar extending parallel to the plane of movement of the contactor having a notch therein, and a spring pressed pawl carried by the contactor for engagement in the notch but disengageable therefrom when the contactor is positively moved.

41. In a coupler, a movable contactor device, a bus line connector carried thereby, fluid pressure means for operating the contactor, a bus line switch and fluid pressure means for closing the switch before the bus line connection is made by the contactor.

42. In combination an electric coupler comprising fluid pressure means operated upon impact of the coupler for opening the coupler, a fluid pressure projectable contactor, a bus line connector carried by the contactor, a bus line switch operated upon impact of the coupler, and means for operating the contactor after impact of the coupler.

43. In combination a coupler having a movable door, a fluid pressure door opening device, a fluid pressure projectable contactor operable after said device, a bus line connector carried by the contactor, a bus line switch, fluid pressure means for closing the switch, and a manually controlled fluid pressure device for operating the projectable contactor to complete the bus line connection.

44. In combination, an electric multiple connector comprising a movable contactor, a bus line connector carried thereby, a bus line switch, a bus line circuit breaker, and a controlling circuit for the circuit breaker comprising means carried by the bus line switch for completing the said circuit only when the bus line switch is entirely open or entirely closed.

45. In combination, a coupler having a projectable contactor, a bus line connector carried thereby, a bus line, a bus line switch, fluid pressure means for controlling the contactor, fluid pressure means for controlling the bus line switch, and other fluid pressure means for preventing the retraction of the bus line contactor until the bus line switch has been opened.

46. The combination with an electric coupler comprising a projectable contactor, a bus line connector carried thereby, a bus line switch, a bus line connected through said switch and said connector, a circuit breaker for said bus line, and an energizing circuit for said circuit breaker comprising a pair of contacts carried by the bus line switch for completing circuit connections only when the bus line switch is entirely open or entirely closed.

47. The combination with a coupler of the class described, comprising a projectable contactor, of a bus line connector carried thereby, a fluid pressure device for operating the contactor, a bus line switch in circuit with the connector when the contactor is projected, fluid pressure means for closing the bus line switch and other means for opening the bus line switch.

48. The combination with a coupler of the class described, comprising a projectable contactor, of a bus line connector carried thereby, a fluid pressure device for operating the contactor, a bus line switch in circuit with the connector when the contactor is projected, fluid pressure means for closing the bus line switch, and fluid pressure means for preventing the retraction of the contactor until the bus line switch is opened.

49. The combination with a coupler of the class described, comprising a projectable contactor, of a bus line connector carried thereby, a fluid pressure device for operating the contactor, a bus line switch in circuit with the connector when the contactor is projected, fluid pressure means for closing the bus line switch, and means for insuring the opening of the bus line switch previous to the retraction of said contactor.

50. In apparatus of the class described, a bus line, a fluid pressure projectable connector for the bus line, other means for controlling the bus line to protect said projectable connector including a bus line switch comprising a fluid pressure operating cylinder and a movable plunger therein, and a spring for retracting the plunger when fluid under pressure is exhausted from the cylinder.

51. In apparatus of the class described, a bus line, a fluid pressure projectable connector for the bus line, other means for controlling the bus line to protect said projectable connector including a bus line switch comprising a rotatable drum, an operating plunger and cylinder therefor and a check valve connected to the cylinder for admitting fluid under pressure thereto and for exhausting said fluid under pressure therefrom.

52. In apparatus of the class described, a bus line, a fluid pressure projectable connector for the bus line, other means for controlling the bus line to protect said projectable connector including a bus line switch comprising a cylinder and a plunger movable therein, means for admitting fluid under pressure to the cylinder to close the switch, said means having an atmospheric outlet and a plunger to open the bus line cylinder to exhaust, and means to open the switch when the cylinder is open to exhaust.

53. In apparatus of the class described, a bus line switch comprising a cylinder and a plunger movable therein, means for admitting fluid under pressure to the cylinder to close the switch, a spring for opening the switch and a check valve comprising a central chamber connected to the cylinder, an end chamber connected to a source of fluid pressure supply, another end chamber having an exhaust opening, a plunger in the last named chamber, a double piston member to close either the fluid pressure chamber or the exhaust chamber from connection with the central chamber, the said plunger engaging the double valve member to open the cylinder to exhaust when desired.

54. The combination with a coupler comprising a movable contactor and a fluid pressure device therefor, of a bus line, a bus line connector carried by the contactor, a switch for the bus line, fluid pressure means for closing the switch, a spring for opening it, a check valve for admitting fluid under pressure to the switch closing means, an exhaust for fluid under pressure from said switch closing means, and an interlocking valve to prevent the operation of the said contactor in breaking the bus line circuit before the switch is opened.

55. The combination with a coupler of the class described comprising a movable contactor, a fluid pressure device therefor, a bus line connector carried by the contactor, a bus line, a switch for the bus line comprising a fluid pressure cylinder and plunger for closing the switch, a spring for retracting the plunger, and an interlocking valve for preventing the admission of fluid under pressure to retract the contactor until the bus line switch is opened by said spring.

56. The combination with a coupler of the class described comprising a movable contactor, a fluid pressure device for moving it positively in both directions, a bus line, a bus line connector carried by the contactor, a switch for the bus line comprising a cylinder and a plunger movable therein, means for opening the cylinder to pressure and to exhaust, an interlocking valve connected to the fluid pressure means for retracting the contactor, and means in connection with said plunger to prevent the opening of said interlocking valve until the bus line cylinder is opened to exhaust, allowing its spring to retract the plunger.

57. In apparatus of the class described, a bus line switch comprising a cylinder and a plunger movable therein, a spring for retracting the plunger, a check valve for opening the cylinder to fluid under pressure or to exhaust, an interlocking valve having means engageable by the plunger when it is retracted for opening the valve, and an uncoupling valve for admitting fluid under pressure to the check valve thereby opening the cylinder to exhaust and subsequently admitting fluid under pressure through the interlocking valve.

58. The combination with a coupler of the class described, comprising a projectable contactor, a fluid pressure device for moving the contactor positively in both directions, a bus line, a bus line connector carried by the contactor, a switch for the bus line, means comprising a cylinder and a plunger for closing the switch, a spring to engage the plunger for opening the switch, means comprising a check valve for opening the cylinder to pressure or to exhaust, said check valve comprising a plunger for positively opening the cylinder to exhaust, an interlocking valve engaged by the said first plunger for opening the valve when the plunger is retracted by the spring, a tubular connection from the interlocking valve to the retracting end of the contactor operating device, an uncoupling valve for admitting fluid under pressure both to the interlocking valve and to the check valve for operating the said second plunger therein, whereby the said cylinder is opened first to exhaust and then fluid under pressure is admitted through the interlocking valve to the forward end of said contactor operating device for retracting the contactor after the said switch is opened.

59. In a coupler of the class described, a multiple electric connector comprising a fluid pressure operating device, a bus line joined in part by said connector, a bus line switch for said connector having a fluid pressure operating device, an uncoupling valve for admitting fluid under pressure to operate the said connector, and an interlocking valve controlled by the bus line switch in uncoupling to insure its operation before the said connector is operated.

60. A car and electric coupling comprising a pair of couplers, one for each car end, and each including in combination a car coupler, a multiple electric coupler comprising a projectable contactor, a fluid pressure device for operating the contactor of each of the couplers every time they are coupled, fluid pressure means for uncoupling the car coupler, and a valved connection for preventing the operation of the said means until the contactor has been retracted.

61. A car and electric coupler comprising a reservoir line having a valve which is opened upon impact with another car coupler, an electric coupler comprising a pivoted door, a projectable contacting device and a fluid pressure device for opening the door independent of the contacting device connected to the said reservoir line for automatically opening the door upon impact of the coupler with another coupler.

62. The combination with an electric coupler having a pivoted door, and a projectable contacting device, of a fluid pressure door opening device, a reservoir line having connection with said door opening device and having a valve which opens the reservoir line to the door opening device without engagement by the contacting device upon impact of two couplers, and a spring for closing said valve when two couplers are separated.

63. In a coupler of the class described, a combination air and electric connection comprising a tubular conductor, which normally projects beyond the face of the coupler, a tubular connection for the inner end thereof and an electrical contact connection at the inner end thereof.

64. In a coupler of the class described, a combination air and electric connector comprising a tubular conductor having one end normally spring pressed beyond the face of the coupler, a flexible tubular connection connected at the other end, and an electric terminal member at the other end for an electrical connector.

65. In a coupling of the class described, a pair of couplers each comprising a projectable contactor, a fluid pressure device for positively moving the contactor in both directions, the contactors of the couplers making double connections, a valve for admitting fluid under pressure to retract the connector, a fluid pressure uncoupling device, and a tubular connection therefrom to said valve, the valve preventing the operation of said device until the contactor is retracted.

66. In a coupler of the class described, a projectable contactor, a cylinder and plunger for operating the contactor, means controlling the admission of fluid under pressure to one end of the cylinder, and a separate fluid pressure device having a movable plunger for admitting fluid under pressure to the other end of the cylinder.

67. A pair of car couplers each comprising a movable contactor, a fluid pressure device for advancing the contactor into the other coupler and for retracting it, an electro-pneumatic device for controlling the advancement of each contactor, a fluid pressure device for controlling the retraction of each contactor, and a combined air and electric connector for each coupler having a tubular connection with the last named fluid pressure device and for completing a circuit through the electro-responsive device whereby the said contactors in adjacent couplers are advanced and retracted simultaneously.

68. A pair of counterpart couplers each comprising a movable contactor, fluid pressure devices for advancing and retracting the contactors, a combined air and electric connection, means comprising electro-responsive devices energized through said connection to actuate said fluid pressure devices for simultaneously advancing both of the contactors, and means comprising fluid pressure connections through said combined air and electric connector for simultaneously retracting both of said contactors.

69. In a coupler of the class described a movable contactor, a fluid pressure cylinder and plunger for operating the contactor, means for admitting fluid under pressure at one end to project the contactor and valved means for admitting fluid under pressure at the other end of the cylinder to retract the contactor, the first-named means at this time opening the first-mentioned end of the cylinder to exhaust.

70. A car and electric coupler comprising a fluid pressure car uncoupler, a multiple electric contactor, a fluid pressure cylinder and plunger for advancing and retracting the contactor, means for admitting fluid under pressure to project the contactor, valvular means having connection with the car uncoupling device, and a controlling device for opening the rear of said cylinder to discharge air to the uncoupling device when fluid under pressure is admitted at the other end of the cylinder to retract the contactor.

71. A car and electric coupler comprising a fluid pressure car uncoupling device, a multiple electric contactor, a cylinder and plunger for advancing and retracting the contactor, means for admitting fluid under pressure at the rear of the cylinder, means for admitting fluid under pressure at the front of the cylinder, and a fluid pressure connection substantially the thickness of the plunger from the rear of the cylinder to open a direct connection from said cylinder to the uncoupling device when the contactor is fully retracted.

72. The combination with a pair of coöperating car couplers, of a multiple electric connector comprising a projectable contactor carried by each coupler, means for positively projecting the contactors of both couplers every time a coupling is made, a car uncoupling device associated with each coupler, and means depending upon the retraction of the contactor of a given coupler for operating the uncoupling device of that coupler.

73. The combination with car reservoir and brake lines each having a valve opened upon contact with corresponding lines, a multiple electric contactor, a fluid pressure device for advancing and retracting it, means for connecting the device with the reservoir line for advancing the contactor when the reservoir line valve is opened, a fluid pressure uncoupling device, means for connecting the uncoupler device to fluid under pressure after the contactor has been retracted, a spring for closing the reservoir line valve when the couplers are separated, and means comprising a fluid pressure device in connection with the uncoupling device for closing the brake line valve when the couplers are separated.

74. In a car and electric coupling, the combination with brake and reservoir lines each having a valve opened upon impact with counterpart lines, a car uncoupling device, a fluid pressure device in connection with the uncoupling device for positively closing the brake line valve when the cars are separated, and a multiple electric contactor having a fluid pressure device for operating it by pressure from the reservoir line, and means to prevent the operation of the car uncoupling device until the contactor is retracted.

75. In combination, a car coupler having a fluid pressure uncoupling device, an electric coupler having a projectable contactor and a fluid pressure operating device for the contactor, a bus line connector carried by the contactor, a bus line switch, fluid pressure means for closing the switch, an uncoupling valve, means for preventing the retraction of the contactor until the bus line switch is opened, and means for preventing the operation of the uncoupling device until the contactor is fully retracted.

76. In a coupler of the class described, a movable contactor, a fluid pressure device for operating the contactor, a plurality of electric connectors carried by the contactor including a bus line connector, a bus line, a bus line switch, means for opening and closing the switch, a circuit breaker for opening the bus line circuit when the switch is not entirely closed or entirely opened, auxiliary contacts carried by the switch, and a magnetic blowout in connection with the switch for extinguishing the arc formed by the opening of the switch if current is flowing in the bus line.

77. In a multiple electric and bus line coupler, the combination with a bus line and a bus line switch, of means for connecting the bus line through the coupler head, means for operating the switch to protect said bus line connecting means, auxiliary contacts connected with the switch terminals, and means for extinguishing the arc between the auxiliary contacts when the switch is opened.

78. The combination with an electric coupler comprising a projectable contactor, a bus line connector carried thereby, a rotatable bus line switch, a bus line connected through said switch and said connector, a circuit breaker for said bus line and an energizing circuit for said circuit breaker comprising a pair of contacts carried by the switch, and a pair of spaced terminals engaged and connected by any one of the contacts carried by the switch for completing the said circuit connections for the circuit breaker only when the bus line switch is entirely open or entirely closed.

In testimony whereof we have signed our names to this specification, on this 15th day of May, A. D. 1917.

REX G. AVERILL.
CHARLES H. TOMLINSON.